United States Patent [19]
Oltman et al.

[11] 3,964,932
[45] June 22, 1976

[54] BATTERY HAVING DEFORMATIONS IN A METAL LAYER

[75] Inventors: John E. Oltman, Mount Horeb; Ralph H. Feldhake, Verona, both of Wis.

[73] Assignee: ESB Incorporated, Philadelphia, Pa.

[22] Filed: Aug. 14, 1975

[21] Appl. No.: 604,716

Related U.S. Application Data

[63] Continuation-in-part of Ser. No. 326,697, Jan. 26, 1973, abandoned.

[52] U.S. Cl. .............................. 136/111; 136/133
[51] Int. Cl.² ...................................... H01M 1/00
[58] Field of Search ........... 136/111, 133, 175, 169, 136/170, 166

[56] References Cited
UNITED STATES PATENTS

| | | | |
|---|---|---|---|
| 2,775,534 | 12/1956 | Herbert | 136/111 X |
| 3,615,861 | 10/1971 | Braem | 136/111 |
| 3,723,184 | 3/1973 | Stark et al. | 136/133 |

Primary Examiner—Anthony Skapars
Attorney, Agent, or Firm—Raymond L. Balfour; Robert H. Robinson; Anthony J. Rossi

[57] ABSTRACT

A plurality of deformations is provided in a metal layer in a battery to avoid wrinkles in that metal layer. The deformations may be situated in that portion of the metal layer which is part of a peripheral sealing system for the battery and/or in that portion of the metal layer inside the peripheral sealing system. The deformations may be oriented along axes which are (a) substantially concentric with the edges of the peripheral sealing system, (b) substantially perpendicular to the edges of the sealing system, or (c) neither (a) nor (b). The metal layer may have a pocket indented therein, the indented pocket being situated inside the peripheral sealing system and over the electrodes of the battery.

7 Claims, 17 Drawing Figures

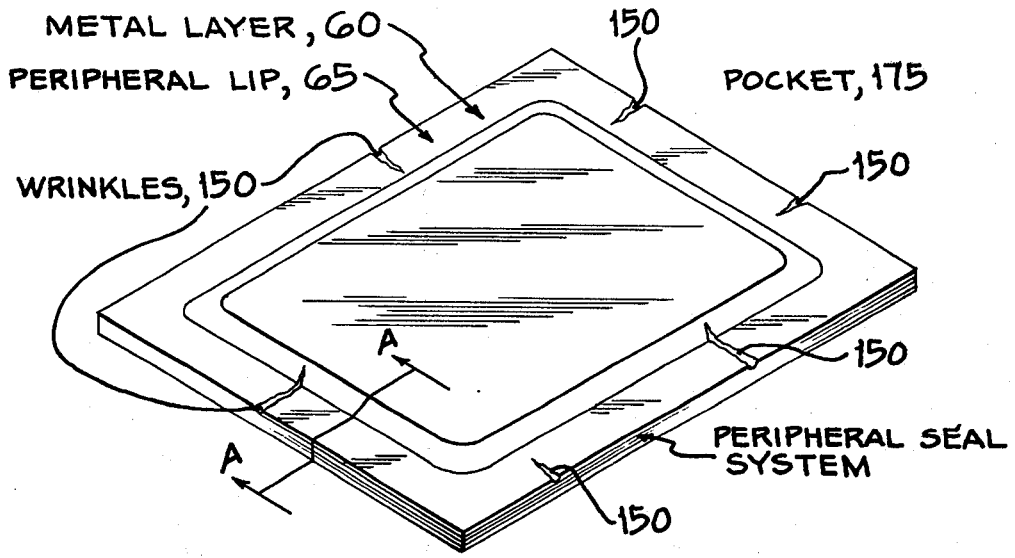
Fig.1 (ILLUSTRATION OF BATTERY WITH WRINKLES)
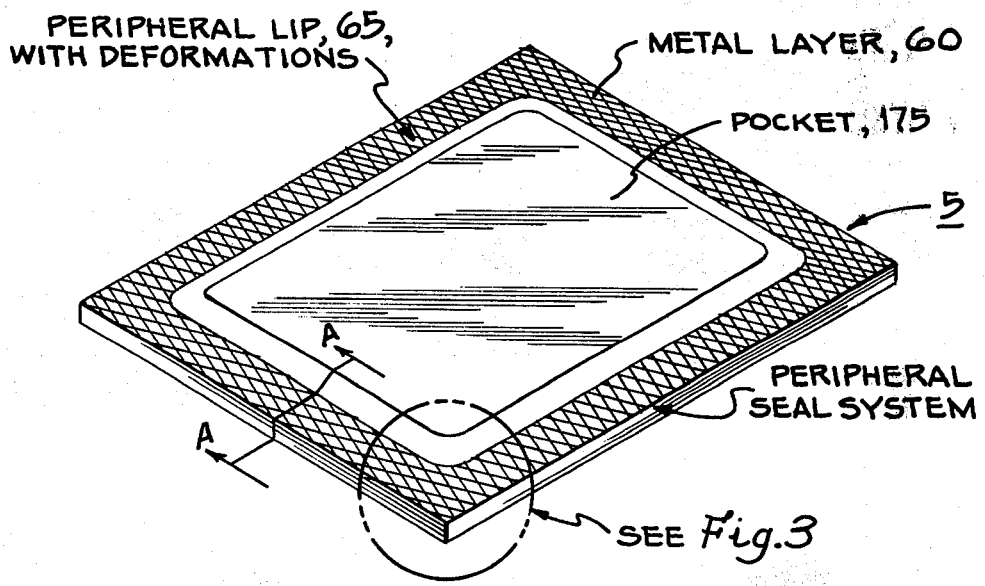
Fig.2 (ILLUSTRATION OF BATTERY WITH DEFORMATIONS)

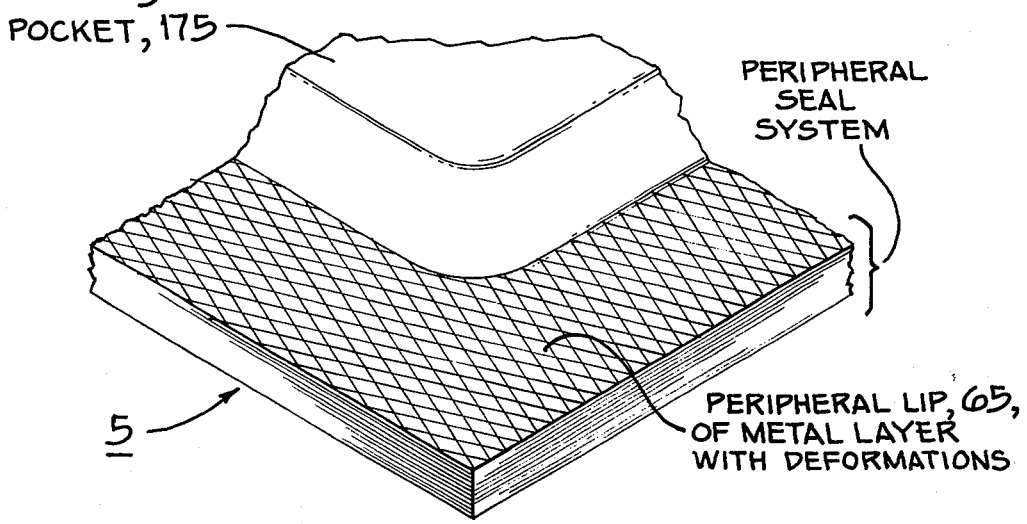
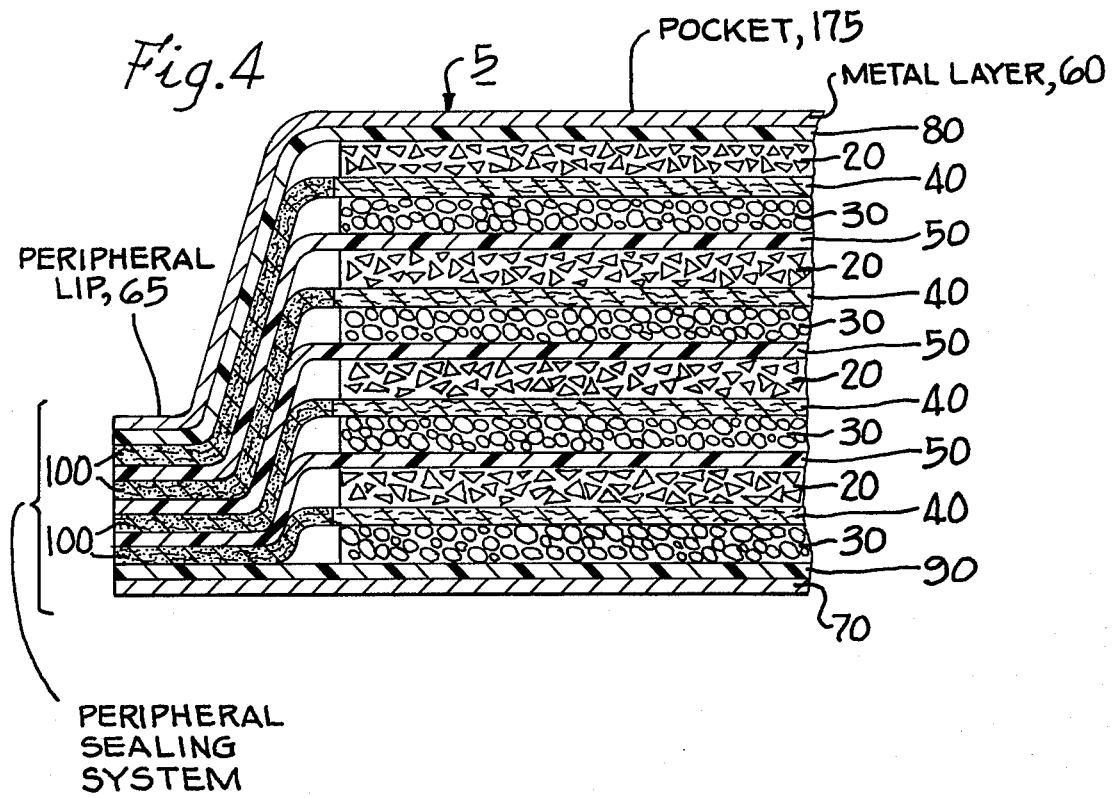

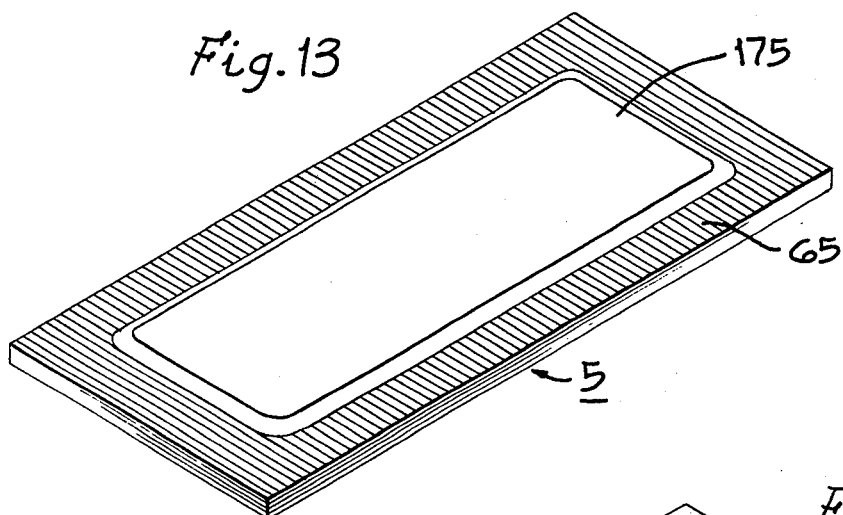
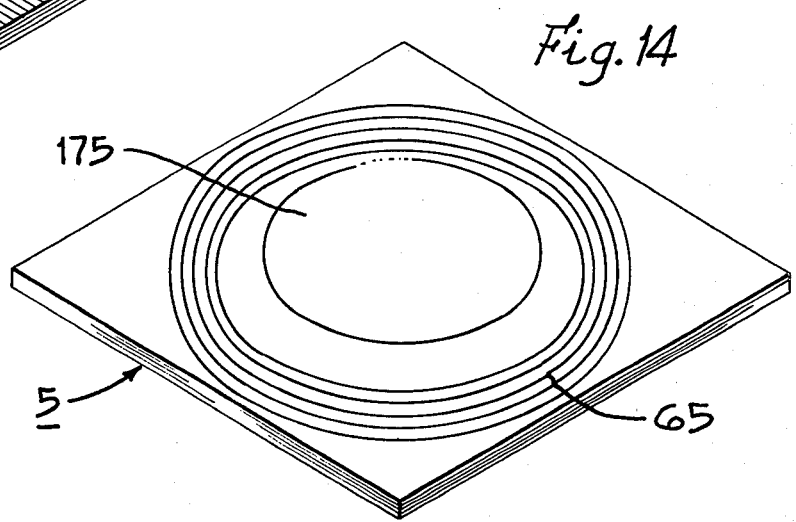
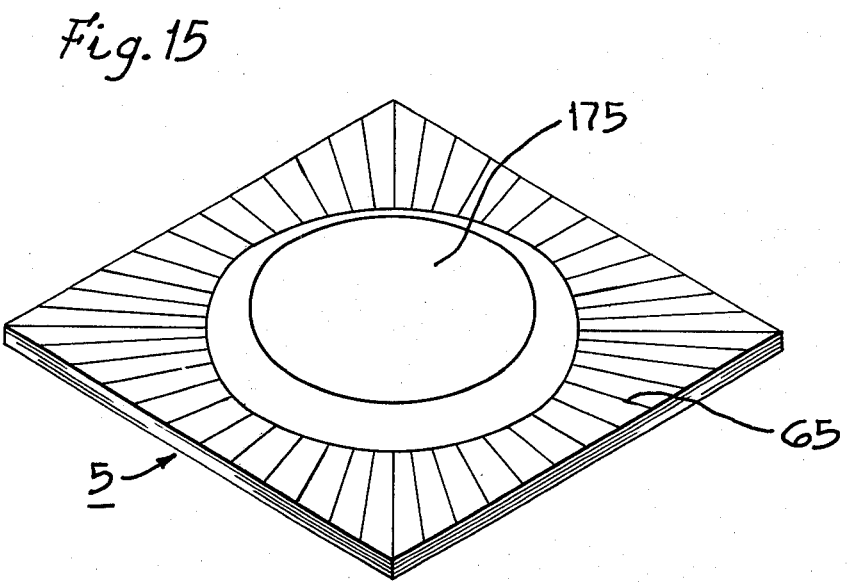

BATTERY HAVING DEFORMATIONS IN A METAL LAYER

CROSS-REFERENCE TO RELATED APPLICATION

This is a continuation-in-part of our application Ser. No. 326,697 filed Jan. 26, 1973, now abandoned.

BACKGROUND OF THE INVENTION

A number of previously issued patents describe batteries which include at least one metal layer having a peripheral lip which is sealed to at least one other component of the battery as part of the peripheral sealing system for the battery. U.S. Pat. No. 3,775,188, for example, describes a process of indenting pockets in the metal layers, the indented pockets being situated inside the peripheral sealing system and over the electrodes of the battery.

We have discovered that when these peripheral lips in the metal layers are left as essentially plane surfaces there is a tendency for concentrated wrinkles to develop at one or more locations along the lip. These wrinkles, which we believe are probably produced by accumulations of stresses developed during sealing, are undesirable inasmuch as they may provide leakage paths through what is intended to be a moisture-tight peripheral sealing system and/or they may result in unwanted electrical paths in the battery.

We also believe that stresses may occur in that portion of the metal layer situated inside the peripheral sealing system, which stresses may tend to produce wrinkles in that portion of the metal layer. These wrinkles are potentially undesirable and should also be avoided.

Our invention is aimed at achieving a battery of the type described above which is free from these wrinkles.

SUMMARY OF THE INVENTION

This invention seeks to prevent the undesirable stresses from occurring by providing a plurality of deformations in the metal layer in the battery. The deformations may be situated in that portion of the metal layer which is part of a peripheral sealing system for the battery and/or in that portion of the metal layer inside the peripheral sealing system. We postulate that these deformations distribute the stresses throughout the metal in a manner sufficient to prevent the wrinkles from occurring.

Our invention is useful in batteries in which the metal layer has a pocket indented therein as shown by U.S. Pat. No. 3,775,188. Our invention is also useful in batteries in which the metal layer does not have such a pocket.

In certain preferred embodiments the deformations extend along the peripheral lip around the entire circumference of the peripheral sealing system.

The deformations may be oriented along axes which are (a) substantially concentric with the edges of the peripheral sealing system, (b) substantially perpendicular to the edges of the sealing system, or (c) neither (a) nor (b).

BRIEF DESCRIPTION OF THE DRAWINGS

FIG. 1 is a pictorial view of a battery having a metal layer as its upper surface. Wrinkles are shown in the peripheral lip surrounding a substantially rectangular pocket indented in the metal layer.

FIG. 2 is a pictorial view of a battery having a metal layer as its upper surface and having a plurality of deformations in the peripheral lip surrounding a substantially rectangular pocket indented in the metal layer.

FIG. 3 is a magnified view of a portion of the battery shown in FIG. 2.

FIG. 4 is a cross-section of the battery shown in FIGS. 1 or 2, taken along line A—A of either of those figures.

FIG. 13 shows a battery similar to the one appearing in FIG. 2 except that it is substantially longer in one of its principal horizontal dimensions and except further that its metal layer has the pattern of deformations illustrated in FIG. 8.

FIG. 14 is similar to FIG. 2 except that the pocket indented in the metal layer is substantially circular in configuration and except further that the deformations are in the pattern of a plurality of circular deformations concentric with the pocket.

FIG. 15 is similar to FIG. 14 except that the deformations take a radial pattern.

DESCRIPTION OF THE PREFERRED EMBODIMENTS

Figure 5:
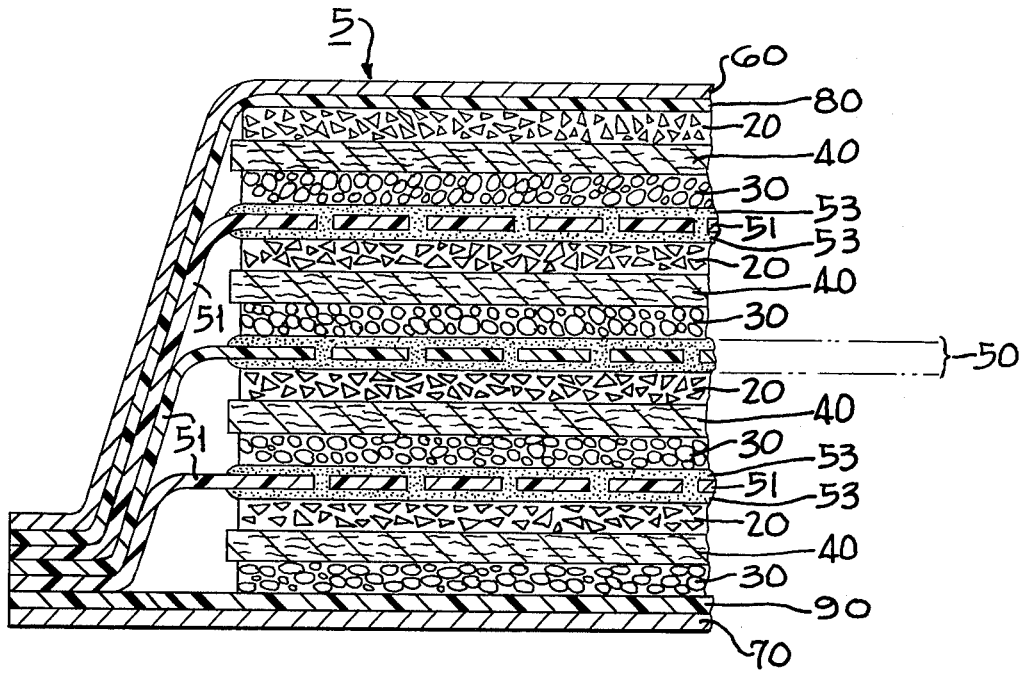
FIGS. 5 and 6 show cross-sections which are alternative to the one shown in FIG. 4.

FIG. 1 illustrates a battery 5 having the wrinkles 150 which this invention seeks to prevent. The battery 5 shown in FIG. 1 has a metal layer 60 as its upper surface. A peripheral lip 65 extends around the periphery of the battery and forms a component of a peripheral sealing system by being sealed to at least one other component of the battery. Inside the peripheral lip 65 and the peripheral sealing system is a pocket 175 which has been indented into the metal layer 60.

As previously stated, we have discovered that the wrinkles 150 tend to provide moisture leakage paths and/or to result in unwanted electrical paths. Our invention is aimed at achieving a battery which is free from these wrinkles.

FIG. 2 shows a battery 5 which has been provided with a plurality of deformations to prevent the wrinkles from occurring. These deformations, which are present in metal layer 60 at the upper surface of the battery, are situated in the peripheral lip 65 of the metal layer 60. Inside this peripheral lip 65 is a pocket 175, generally rectangular in configuration, which has been indented in metal layer 60 and which is situated over the electrodes of the battery. The deformations appearing in FIG. 2, which are shown on an enlarged scale in FIG. 3, are generally diamond-shaped in configuration; this configuration is produced by lines deformed into the metal layer 60 which intersect each other and which are oriented to be neither perpendicular nor parallel to the edges of the indented pocket 175.

FIG. 4 is a cross-section of the battery shown in FIGS. 1 or 2, taken along line A—A of either of those figures. As shown in FIG. 4, the battery 5 has four cells each of which comprises a positive electrode 20, a negative electrode 30, and a separator layer 40 which prevents the positive and negative electrodes from contacting each other. The cells are separated from one another by intercell connector layers 50 made from an electrically conductive plastic. Both the separator layers 40 and the intercell connector layers 50 extend beyond the edges of the electrodes, and those extensions in the separator layers 40 have been impregnated with an electrically nonconductive adhesive 100; for more details of this feature, see U.S. Pat. No. 3,701,690. At the top of the battery is a laminate of metal layer 60 and a layer of electrically conductive plastic 80, while a similar laminate of a metal layer 70 and conductive plastic 90 is to be found at the bottom of the battery; both of the laminates 60–80 and 70–90 extend beyond the edges of the electrodes, as shown in FIG. 4. the battery; both of the laminates 60–80 and 70–90 extend beyond the edges of the electrodes, as shown in FIG. 4.

Referring now to FIGS. 2 through 4, it can be seen that the peripheral lip 65 is sealed to another component of the battery and comprises a member of a peripheral sealing system for the battery. This peripheral sealing system, which provides a moisture barrier around the electrodes to prevent the escape of moisture from the battery, is produced by the seals between the deposits of adhesive 100 and the other components 80, 40, 50, and 90. The deformations made in the metal layer 60 extend to that portion of layer 60 which forms part of this peripheral sealing system.

FIG. 5 illustrates a battery 5 which may have the same external appearance as the battery appearing in FIGS. 2 through 4 but having a cross-section which is alternative to the one shown in FIG. 4. Rather than have the intercell connector layer 50 made of electrically conductive plastic as in FIG. 4, the cross-section of FIG. 5 shows the intercell connector layers 50 comprising electrically nonconductive components 51 having holes therein, with electrically conductive material 53 extending through the holes and making electrical contact with a positive electrode 20 and a negative electrode 30 on the opposite sides of component 51. The components 51 extend beyond the edges of the electrodes 20 and 30 and the separators 40 into the peripheral sealing system where they are heat sealed to each other and to other components of the battery to produce the peripheral moisture seal.

Figure 6:
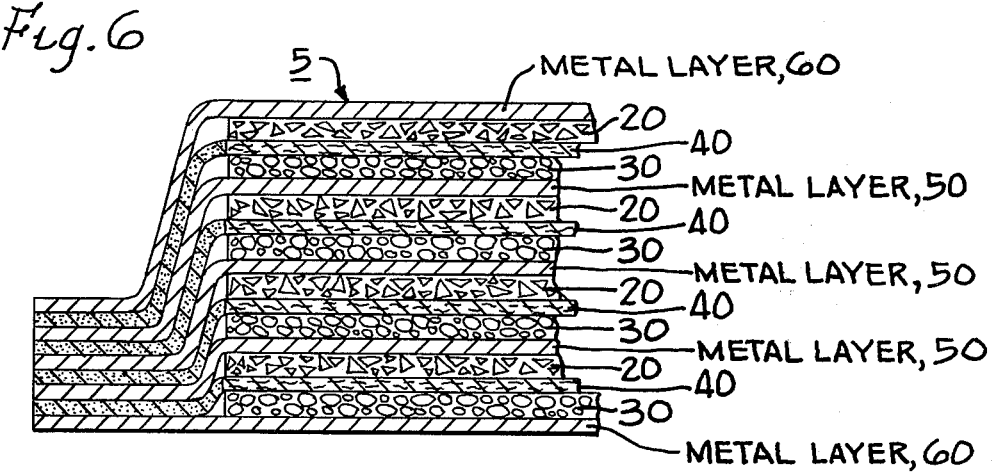

FIG. 6 illustrates a battery 5 which also may have the same external appearance as the battery appearing in FIGS. 2 through 4 but having a cross-section which is alternative to the ones shown in FIGS. 4 and 5. The laminates 60–80 and 70–90 appearing in FIGS. 4 and 5 have been replaced with metal layers 60 at the top and bottom surfaces of the battery, and the intercell connector layers 50 which divide the cells from each other have also been made from metal. The surfaces of the metal layers 60 and 50 which contact the electrodes 20 and 30 are selected from metals which will not produce any undesired electrochemical reactions. The edges of the metal layers 60 and 50 extend beyond the edges of the electrodes and are sealed in the peripheral seal area by the same deposits of adhesive 100 impregnated into extensions of the separators 40 that are shown in FIG. 4. For reasons which will be set forth more completely later in this description, it may be desirable to provide deformations in the peripheral lips of more than one, and possibly all, of the metal layers 60 and 50 shown in FIG. 6.

Figure 7:
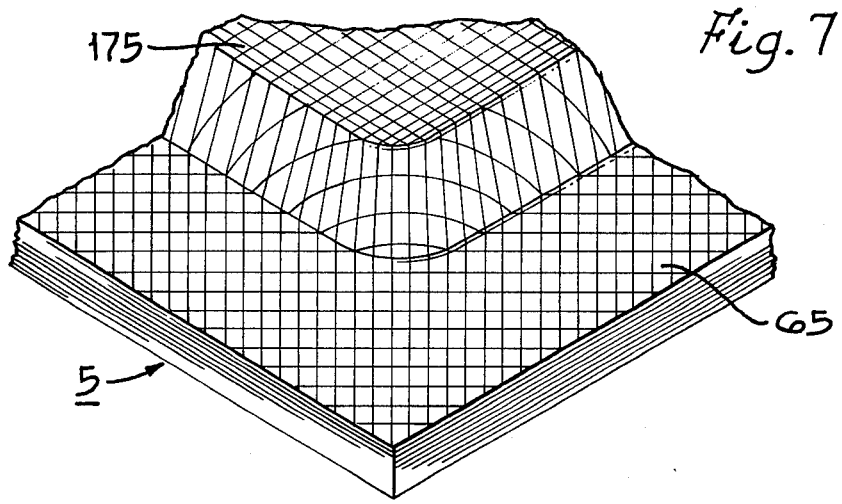
FIGS. 7 through 12 show patterns of the deformations in the metal layer which are alternatives to the pattern shown in FIG. 3.

Just as FIGS. 4 through 6 illustrate that batteries incorporating the present invention may have a great variety of internal construction features, FIGS. 2, 3, and 7 through 16 illustrate how the deformations required by this invention may take a great variety of configurations and appearances. FIG. 7 for instance, illustrates how the diamond-shaped deformation pattern shown in FIGS. 2 and 3 at only the periphery of the battery may be extended over the indented pocket 175 at the interior of the battery to cover the entire outer metal surface of the battery.

Figure 8:
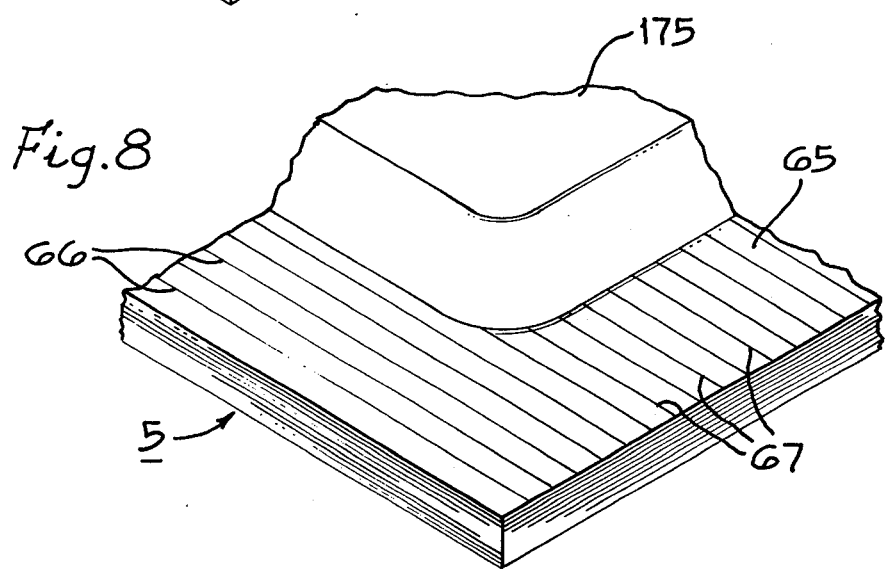

FIG. 8 illustrates the battery of FIG. 2 but with a different deformation pattern. The deformations are of two sets, 66 and 67, each of which comprises one or more straight lines. The deformations in set 66 do not intersect the edges of indented pocket 175 but are substantially parallel to the nearest edge of that pocket, while the deformations in set 67 do intersect an edge of the pocket at an angle which is substantially perpendicular to the edge.

Figure 9:
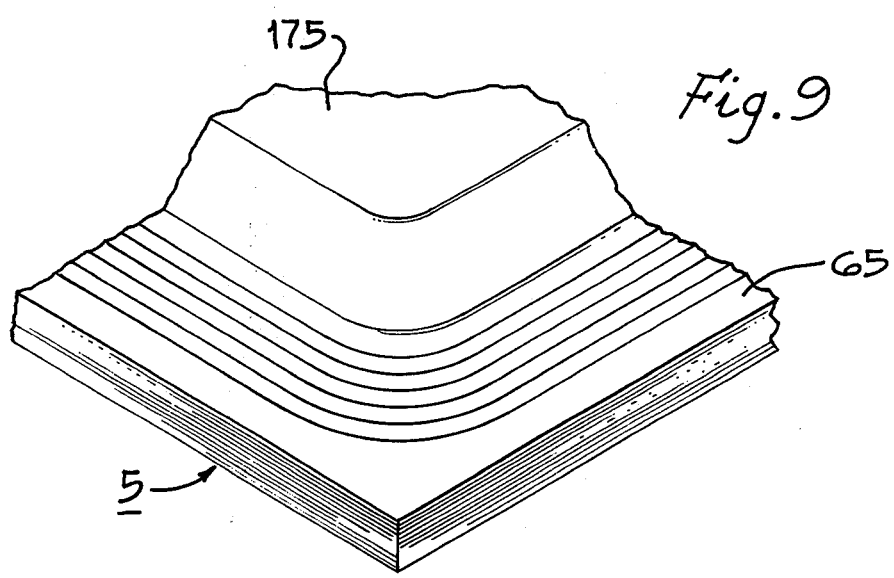

FIG. 9 illustrates the battery of FIG. 2 but with still another deformation pattern, one in which the deformations enclose and are substantially concentric with the edges of the indented pocket 175.

Figure 10:
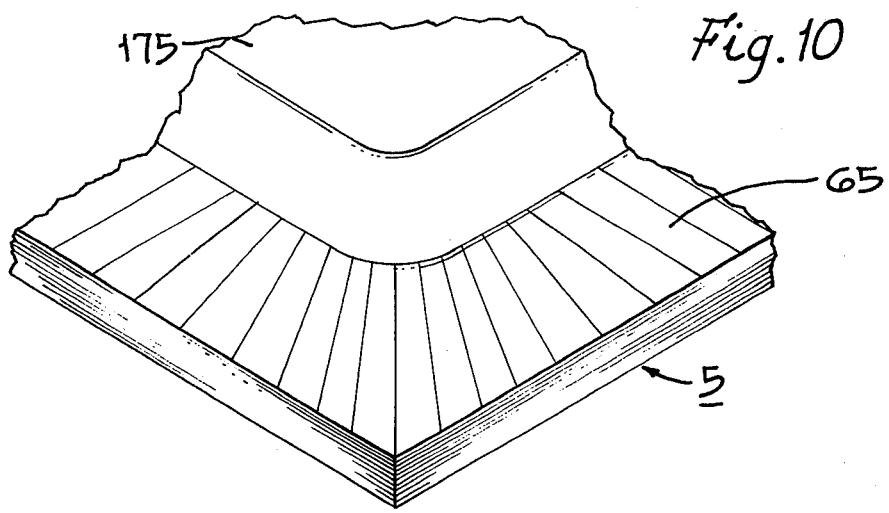

FIG. 10 illustrates still another alternative deformation design in the metal layer on the outer surface, one in which each of the deformations comprises a line which intersects the edge of the pocket at an angle substantially perpendicular to the edge at the point of intersection.

Figure 11:
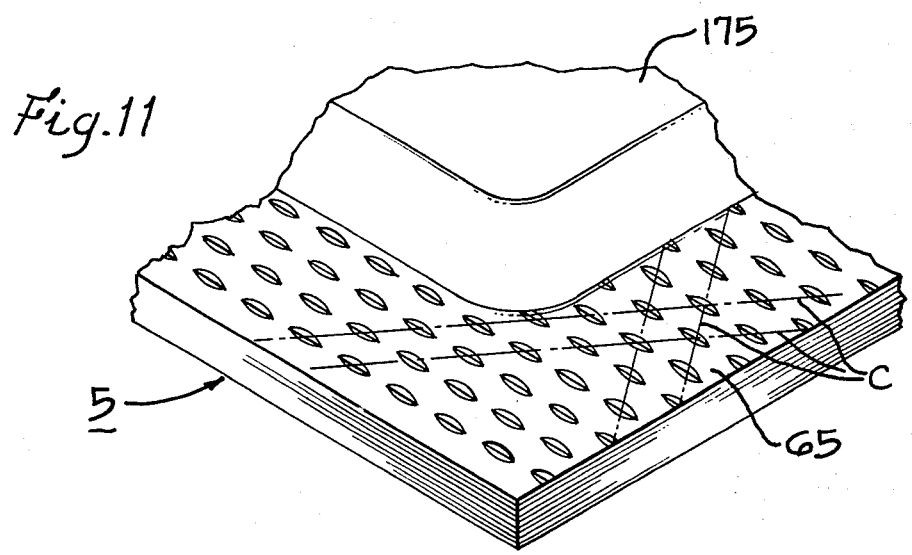

FIG. 11 shows the deformations in the outer metal surface taking the form of a plurality of recesses which might be made, for example, by a small, circular wheel having a tapered edge. These deformations, which could if desired be randomly distributed in the metal surface where they appear, have been shown as being oriented to produce an alignment similar in some respects to the one shown in FIGS. 2 and 3 and similar in other respects to the one shown in FIG. 8.

Figure 12:
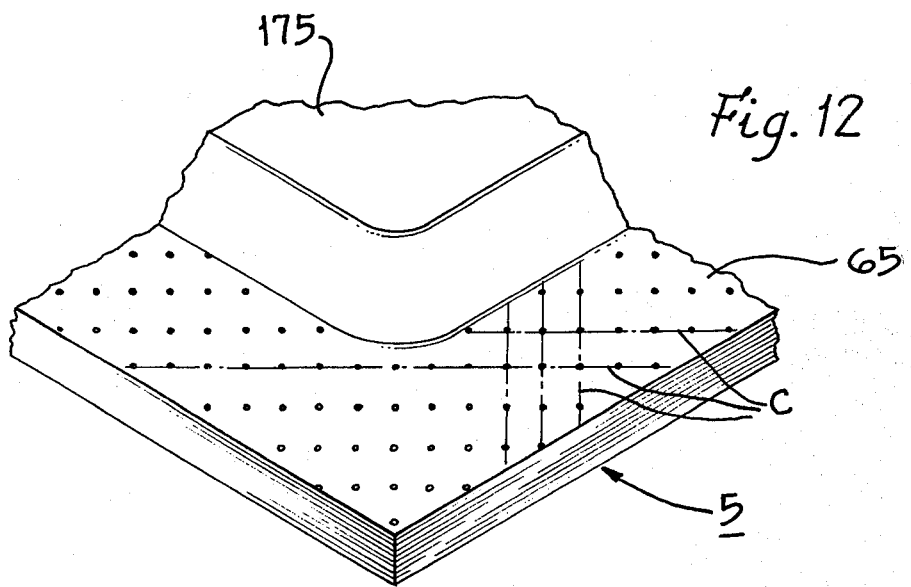

FIG. 12 shows a plurality of deformations each of which may be conical or partially spherical in configuration. These deformations could also be randomly distributed in the metal surface if desired, but have been shown as being oriented to produce an alignment similar in some respects to the one shown in FIGS. 2 and 3 and similar in other respects to the one shown in FIG. 8.

FIG. 13 shows a battery of the type appearing in FIG. 2 except that one of the principal horizontal dimensions has been substantially increased and except further that a deformation design similar to the one shown in FIG. 8 has been included in the outer metal surface.

FIG. 14 shows a battery of the type appearing in FIG. 2 except that the indented pocket 175 is circular in configuration and except further the the deformations are rings which are substantially concentric with the pocket.

FIG. 15 shows a battery of the type appearing in FIG. 2 except that the indented pocket 175 is circular in configuration and except further that the deformations are radial lines each of which intersects the pocket at an angle substantially perpendicular to the edge of the pocket at the point of intersection.

Figure 16:
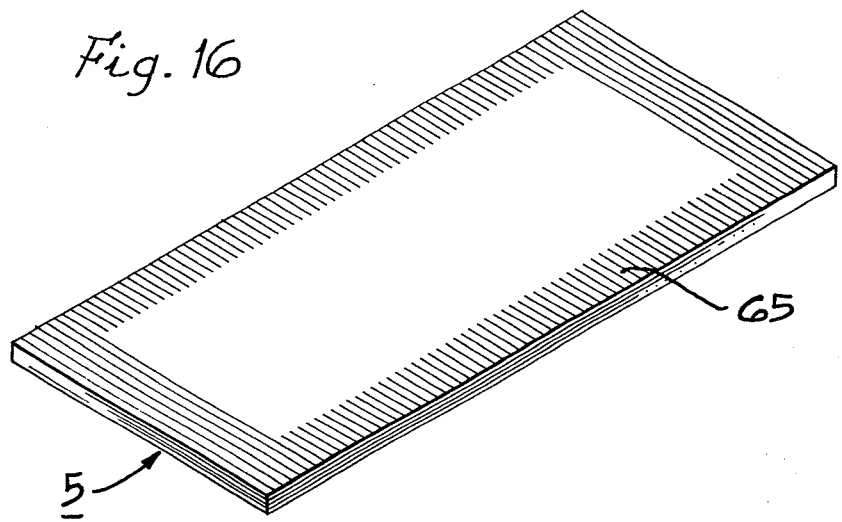
FIG. 16 is similar to FIG. 13 except that no pocket is indented in the metal layer.

FIG. 16 illustrates a battery similar to the one shown in FIG. 13 except that there is no pocket indented in the outer metal surface and except that the thickness of the battery at the peripheral sealed edges is the same as the thickness of the center of the battery.

Figure 17:
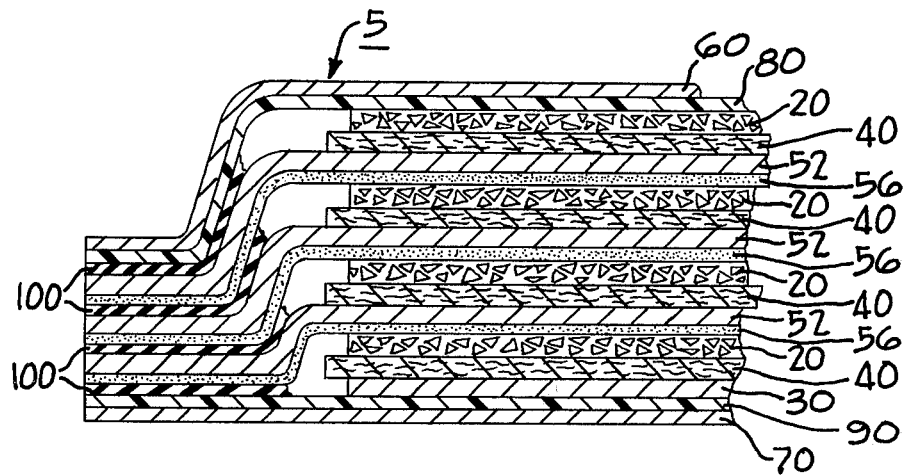
FIG. 17 shows a cross-section which is an alternative to the one shown in FIG. 4.

FIG. 17, which presents an alternative to the cross-section shown in FIG. 4, illustrates a battery in which three of the negative electrodes comprise foils or strips of metal 52 such as zinc. These metal layers are pocketed and have peripheral lips which extend into the peripheral sealing system; deformations may be made in these lips. The intercell connectors are shown as comprising layers of a conductive material 56. The peripheral seals are made utilizing deposits of nonconductive adhesive 100. For additional detail about the battery shown in FIG. 17, see U.S. Pat. No. 3,697,328.

The deformations which we have described and illustrated may be produced by a variety of processes, including those which are sometimes referred to by names such as "embossing", "checking", "waffling", "knurling", "drawing", "quilting", "scoring", "scratching", and "dimpling". Without intending to suggest that these terms have precise and commonly accepted definitions, we offer these terms only as names which may be sometimes used to describe processes which produce the deformations required by this invention. We wish it to be understood that our invention is not limited to one or more specific techniques of producing the deformations.

While we have presented drawings showing the deformations extending along the peripheral lip around the entire circumference of the peripheral sealing system, that feature is a preferred embodiment rather than a fundamental requirement and, as such, may not be needed in all instances. Constructions may be made using a single area of deformations which extends around only a portion of the circumference of the peripheral sealing system or, alternatively, two or more such areas may be used. We prefer that the deformations in the lip of the metal layer extend at least partially around the peripheral sealing system of the battery, without defining a minimum amount of deformed area applicable to all conceivable constructions.

In an effort to explain the cause of the wrinkling problems in the peripheral sealing area and to rationalize our solutions to it we have developed a theory which we will offer as a means of further explaining our invention. We wish it to be understood, however, that the validity of our invention is not to be dependent upon the correctness of our theoretical explanation of it.

We speculate that the wrinkling may result from either or both of two factors, (1) the presence of an indented pocket in the metal layer inside the peripheral lip of the metal which is to be sealed as a component of the peripheral seal system, and (2) the use of heat in the act of sealing the periphery of the battery.

Batteries have been designed which, like those illustrated in our drawings and described above, include one or more metal layers on the exterior and/or in the interior of the battery which metal layers require an indented pocket in the areas where they extend over the electrodes. As shown in our drawings, these layers have a peripheral lip surrounding the pocket which lip is sealed to at least one other component of the battery by means frequently involving the application of heat and/or pressure. Disregarding momentarily the heat used in sealing, we believe that the use of pressure in the sealing operation introduces stresses in the peripheral lip which, unless preventive remedies are applied, will tend to concentrate in one or more locations (as shown in FIG. 1) and produce undesired moisture leakage paths and/or electrical paths. We believe that one preventive remedy to counteract this tendency is to distribute the stresses over a wide area to prevent their accumulation and concentration, this being done by the plurality of deformations we have described above.

A further factor associated with pocketing per se is that the deformations permit slight variations in the intended depth of pocketing. Despite the most diligent efforts it is impossible in mass production processes to consistently achieve pockets each of which has a depth dimension falling within narrow tolerances. The deformations may provide, in effect, joints which can be slightly stretched to compensate for a pocket which is unintentionally undersized by a slight amount.

It is also true that a pocket which is too deep may result in air entrapment and/or poor electrical contact in the battery, and for these reasons it may be desirable to deliberately undersize the depth of the pocket by a slight amount. Where this undersizing is done, however, tensions will develop in the metal layer during and after sealing which result from the stretching which the metal necessarily undergoes. Reasoning from the premise that these tension forces are maximum along lines which are essentially concentric with the edges of the peripheral seal system, it seems desirable to us to include in the metal a plurality of deformations which are perpendicular to these lines of tension. Following the reasoning, we construe the deformations identified as set 66 in FIG. 8 as providing means which provide wrinkle-free accommodations for tension forces which result from undersized pocketing and which are substantially perpendicular to the edge of the seal; the ame interpretation is made of the corresponding deformations shown at the narrow ends of the batteries in FIGS. 13 and 16. Following this reasoning to its logical conclusion, deformations which enclose and are concentric with the seal system should extend entirely around the circumference of the seal, regardless of the configuration of the seal; this concept is illustrated in simple and pure form in FIGS. 9 and 14.

Where pockets are indented in the metal layer, the deformations may be produced in the peripheral lip before, at the same time as, or subsequent to the pocketing step.

The second factor contributing to the occurrence of the undesired wrinkles is the use of heat in the act of sealing the periphery of the battery. When the peripheral metal lip and other layers to which it is to be sealed are first being heated up they of course expand, and by amounts which are not necessarily the same; since these layers of different materials are not yet sealed together their differing rates of expansion causes no problems as they are still free to expand relative to each other. When these layers of different materials are subsequently cooled, the differing rates of contraction in the peripheral sealing system create stresses which tend to weaken the desired and resulting seals and which, we believe, tend to produce the wrinkles we have encountered. In response to this tendency we reason that it might be desirable to include deformations the axes of which are substantially perpendicular to the edge of the peripheral sealing system, this orientation of the deformations providing, in effect, small thermal expansion and contraction joints in the metal. Following this reasoning we construe the deformations identified as set 67 in FIG. 8 as providing these thermal joints, those deformations being substantially perpendicular to the edge of the sealing system. This reasoning is seen carried to its logical conclusion in FIGS. 10 and 15 where the deformations comprise radial lines extending around the entire circumference of the battery, with each such radial deformation line being substantially perpendicular to the edge of the sealing system.

Even assuming the correctness of our theories concerning the forces developed in the battery by individual factors, the resultant vector or composite force may be in a direction which is in neither of the directions described above. For this reason it may be preferable to use a design in which the axes of the deformations are neither (a) substantially concentric with the edges of the peripheral sealing system nor (b) substantially perpendicular to the edges of the sealing system. Illustrations of such designs are the diamond-shaped configurations shown in FIGS. 2, 3, and 7. It will be noted from the lines C in FIGS. 11 and 12 that the deformations appearing in those views also are laid out in this manner.

As we have indicated above, we believe that thermal considerations make it desirable to utilize the deformations, and this is true whether or not the metal layer containing the deformations is pocketed. We have included FIG. 16 to illustrate a battery having deformations in the peripheral lip but no indented pocket in the upper metal surface.

While we have illustrated the deformations as being arranged or oriented in systematic fashions of many different designs, we do not mean to suggest that this is a necessary feature of our invention. A purely random distribution of deformations having no orientation axes whatsoever may well be sufficient to prevent the occurrence of wrinkles.

By the same token, while we have shown the deformations as extending across the entire width of the peripheral lip, i.e., from the outer edge of the battery to the edge of the indented pocket, we do not mean to suggest that it is necessary for the deformations to extend to either of these boundaries. Our drawings illustrate only preferred embodiments and constructions that may be made, not the bare minimums and not all possible permutations of our invention.

From what has been described above it will be apparent that a number of factors, in combination with each other, will determine the optimum deformation size and configuration for a particular battery. The depth of the pocket, if any, and the extent to which the pocket may be undersized are such factors, as are the differences in thermal characteristics of the several layers being sealed together in the peripheral sealing system. Certainly the properties of the metal itself—the extent to which it is elastic or inelastic, for instance—will have influence on the deformation design. Because these factors may combine in a unique manner for each different battery design it is not possible to state in general terms what the best deformation design may be; as an alternative we have attempted to explain what we believe to be the significant factors to be taken into account in arriving at that design.

We believe that stresses may also occur in that portion of the metal layer situated inside the peripheral sealing system, and that to prevent wrinkles from resulting in that portion of the metal it may be desirable to include deformations there also. FIG. 7 illustrates that the metal layer may have deformations inside the peripheral sealing area, and we reason that these deformations may be desirable either in addition or as an alternative to deformations appearing in the sealing system.

Before concluding the description of our invention we wish to observe that it may be included in both single cell and multicell batteries and in batteries having a wide range of compositions.

The positive electrodes 20 may each comprise particles of electrochemically positive active material contained in and dispersed throughout a binder matrix. The positive active material conventionally is divided into tiny particles so as to increase the rate at which the electrochemical reactions can occur by increasing the surface area where they occur. The binder increases the electronic conductivity of the electrode, increases the structural integrity within the positive electrode, and adheres the positive electrode to the carrier strip. Since electrolyte must have access to the surface of the active material particles, the electrode must be made sufficiently porous so that the electrolyte may diffuse throughout the electrode rapidly and thoroughly. Preferably the pores in the electrode are produced by the evaporation of liquid during the construction of the electrode; the evaporating liquid may be part of a dispersion binder system in which the solid binder contained in the finally constructed electrode is dissolved in the liquid which is later evaporated. The porosity of the positive electrodes may be increased as the discharge rate desired in the battery is increased. Electrodes may also be constructed using various combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 may, and preferably will, also contain amounts of a good electrical conductor such as carbon or graphite to improve the electrical conductivity between the active material particles themselves generally being relatively poor conductors of electricity. The conductivity of the active material particles together with the conductivity of the binder itself will influence the amounts of conductors added to the electrode. The electrodes 20 may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 may comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other ingredients in the negative electrodes may have a different optimum than the proportions of analagous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 may also comprise thin sheets or foils of electrochemically negative material.

It is necessary to place a separator and electrolyte between each adjacent pair of electrodes in the collation. This requirement may be met in different ways with different materials including a wide variety of materials such as synthetic fibers, microporous polymer sheets, and cellulosic materials which are conventional in battery construction as well as from woven or non-woven fibrous materials such as polyester, nylon, polyproplene, polyethylene, and glass. Liquid electrolyte solutions could be impregnated into these separator strips or patches of viscous, gelled electrolyte could be applied onto one or both sides of the separator strip. The viscous, gelled electrolytes, which can be made including a wide variety of gelling agents, would contain the needed electrolyte and also adhere or bond to the adjacent electrodes to produce good conductivity. As another alternative, deposits of viscous, gelled electrolytes could by themselves serve as both separators and as electrolyte if of proper thickness and/or consistency, making a distinct separator such as the member 40 shown in the drawings unnecessary. All such alternatives are included within this invention as ways of placing a separator and electrolyte between each adjacent pair of electrodes in the collation.

Several observations should be made in regard to the role of the adhesive patches which may be used to provide the seals around the electrodes. As mentioned earlier, these patches may be impregnated into the separator strip. The adhesive should be applied in liberal quantity so that all of the pores in the separator are completely filled in the area to which the adhesive is applied and so that there is sufficient excessive adhesive to coat and adhere to the other members being sealed by the patches. The adhesives themselves may be selected from a wide variety of materials including such adhesive cements as catalyzed uncured epoxy resins, phenolic resin solutions, ethylene copolymer hot melts, pressure sensitive elastomer mixtures, thermoplastic resin solutions, and natural gums and resins and their solutions. Faster and more thorough and complete impregnation of the adhesive into the separator may be achieved with many hot melt cements by making the impregnations with heat adhesives. The adhesives which may be used may be ones which attain their adhesive quality for the first time during assembly of the battery as a result of the application of pressure, heat, ultrasonics, or other forms of energy.

While it is preferred to employ the LeClanche electrochemical system (comprising manganese dioxide positive active material, zinc negative active material, and an electrolyte comprising ammonium chloride and/or zinc chloride), the multicell battery 5 of this invention may employ a wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the LeClanche system (ammonium chloride and/or zinc chloride), various alkaline electrolytes such as the hydroxides of potassium, sodium and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, silver-zinc, mercury-zinc, mercury-cadmium, and nickel-cadmium may also be used.

Systems employing organic positive electrodes and acidic electrolytes may be used, including rechargeable systems using azodicarbonamide compound electrodes and LeClanche electrolyte.

We claim:

1. An improvement in a battery having a metal layer as a component thereof, the metal layer having a peripheral lip which is adhesively heat sealed to at least one other component of the battery around the periphery of the battery and as part of a peripheral sealing system for the battery,
   the improvement providing means for distributing stresses in the metal layer, the improvement comprising a plurality of deformations in the peripheral lip of the metal layer.

2. The battery of claim 1 in which the deformations also extend into that portion of the metal layer which is inside the peripheral sealing system.

3. The battery of claim 1 in which the deformations extend along the peripheral lip around the entire circumference of the peripheral sealing system.

4. The battery of claim 1 in which the deformations are oriented along axes which are substantially concentric with the edges of the peripheral sealing system.

5. The battery of claim 1 in which the deformations are oriented along axes which are substantially perpendicular to the edges of the peripheral sealing system.

6. The battery of claim 1 in which the deformations are oriented along axes which are not concentric with the edges of the peripheral sealing system.

7. The battery of claim 1 in which the deformations are oriented along axes which are not perpendicular to the edges of the peripheral sealing system.

* * * * *